United States Patent
Renteria et al.

(10) Patent No.: US 6,894,247 B2
(45) Date of Patent: May 17, 2005

(54) POWDER FEED SPLITTER FOR HAND-HELD LASER POWDER FUSION WELDING TORCH

(75) Inventors: Federico Renteria, Greenville, SC (US); William F. Hehmann, Greer, SC (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/206,411

(22) Filed: Jul. 26, 2002

(65) Prior Publication Data

US 2004/0016726 A1 Jan. 29, 2004

(51) Int. Cl.[7] .............................................. B23K 26/00
(52) U.S. Cl. ............................ 219/121.63; 219/121.64
(58) Field of Search ...................... 219/121.63, 121.84, 219/121.64, 121.65, 121.66, 121.85

(56) References Cited

U.S. PATENT DOCUMENTS

| | | | | |
|---|---|---|---|---|
| 3,914,573 A | * | 10/1975 | Muehlberger | 219/76.16 |
| 4,704,030 A | | 11/1987 | Steen et al. | 356/121 |
| 4,724,299 A | | 2/1988 | Hammeke | 219/121 L |
| 4,726,715 A | | 2/1988 | Steen et al. | 406/55 |
| 4,774,392 A | | 9/1988 | Orita | 219/121.63 |
| 4,777,341 A | | 10/1988 | Steen et al. | 219/121.83 |
| 4,803,335 A | | 2/1989 | Steen et al. | 219/121.84 |
| 4,804,815 A | | 2/1989 | Everett | 219/121.6 |
| 5,111,021 A | | 5/1992 | Jolys et al. | 219/121.6 |
| 5,122,632 A | | 6/1992 | Kinkelin | 219/121.63 |
| 5,321,228 A | | 6/1994 | Krause et al. | 219/121.84 |
| 5,418,350 A | | 5/1995 | Freneaux et al. | 219/121.84 |
| 5,453,329 A | | 9/1995 | Everett et al. | 428/565 |
| 5,477,025 A | | 12/1995 | Everett et al. | 219/121.84 |
| 5,477,026 A | | 12/1995 | Buongiorno | 219/121.84 |
| 5,556,560 A | | 9/1996 | Ahola et al. | 219/121.45 |
| 5,620,138 A | * | 4/1997 | Crum | 239/3 |
| 5,837,960 A | | 11/1998 | Lewis et al. | 219/121.63 |
| 5,961,862 A | | 10/1999 | Lewis et al. | 219/121.84 |
| 5,993,549 A | | 11/1999 | Kindler et al. | 118/308 |
| 5,993,550 A | | 11/1999 | Eloy | 118/308 |
| 5,993,554 A | | 11/1999 | Keicher et al. | 118/641 |
| 5,997,643 A | | 12/1999 | Wilson et al. | |
| 6,046,426 A | | 4/2000 | Jeantette et al. | 219/121.63 |
| 6,122,564 A | | 9/2000 | Koch et al. | 700/123 |
| 6,396,025 B1 | | 5/2002 | Pyritz et al. | |
| 6,502,767 B2 | * | 1/2003 | Kay et al. | 239/433 |
| 2001/0008230 A1 | | 7/2001 | Keicher et al. | |

FOREIGN PATENT DOCUMENTS

| | | |
|---|---|---|
| DE | 236 022 A | 5/1986 |
| EP | 0 338 314 A1 | 10/1989 |
| EP | 0 780 190 A1 | 8/1997 |
| JP | 07 051871 A | 2/1995 |
| WO | WO 90/08083 | 7/1990 |
| WO | PCT/US03/23385 | 12/2003 |

* cited by examiner

Primary Examiner—M. Alexandra Elve
(74) Attorney, Agent, or Firm—K. Karen Loewenstein, Esq.

(57) ABSTRACT

A powder feed splitter and a machine using a powder feed splitter, to divide a powder flow into two or more streams in a predictable, adjustable, and reliable manner for use in material processing such as welding. A housing encloses an inlet disk having an inlet regulator preferably a disk, having an inlet tube which may be adjustable radially or laterally with respect to the housing. An adjustment mechanism can selectively move the inlet regulator to adjust the powder flow amongst the several powder outlet ports. Funnel-shaped cavities within the housing may have optional gas inlets to enable the introduction of additional gas to the separated powder flow streams. A one-way fit may be present between the interior powder flow splitter and the exterior casing. Smooth interior surfaces through the device prevent turbulence and buildup of powder.

22 Claims, 4 Drawing Sheets

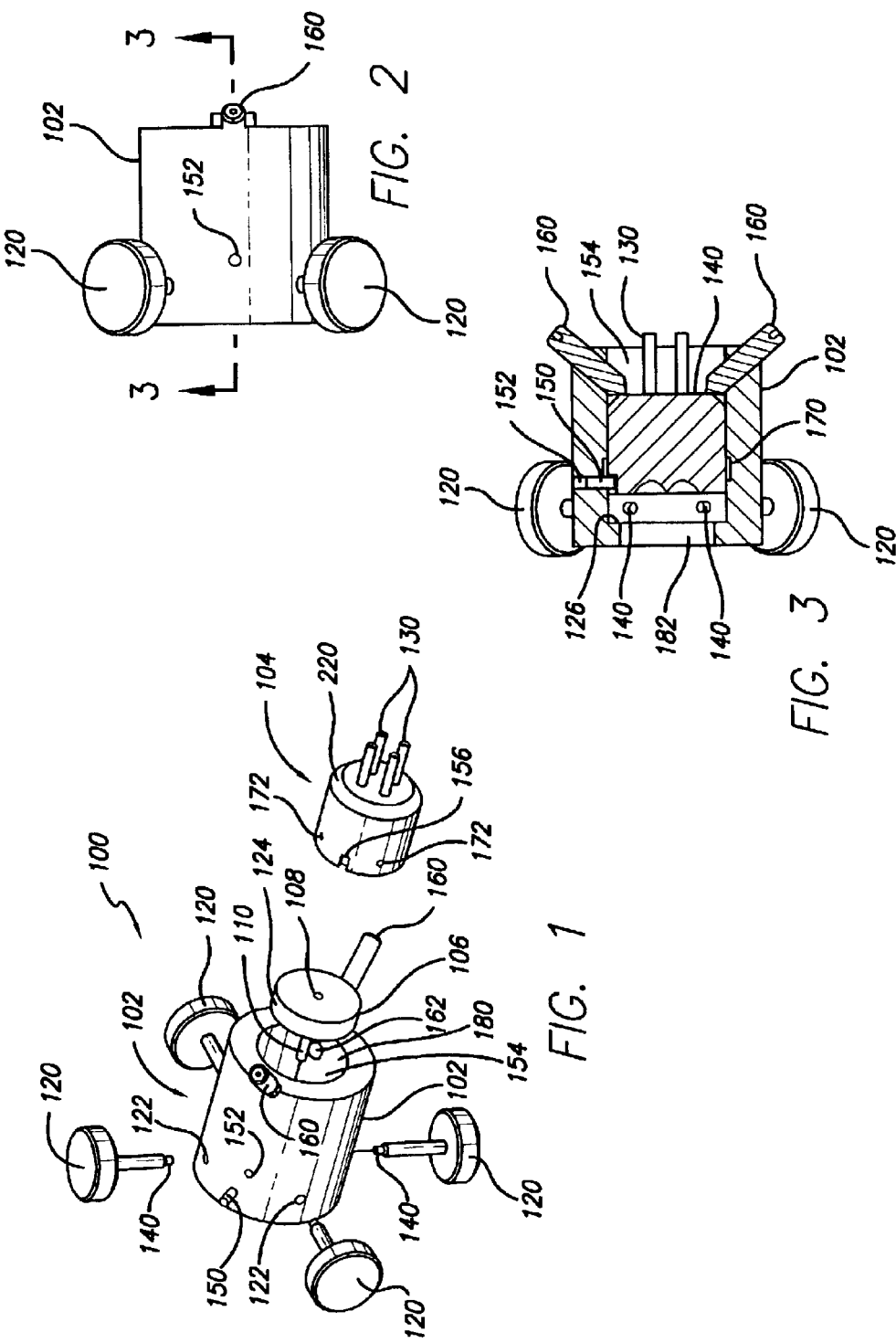

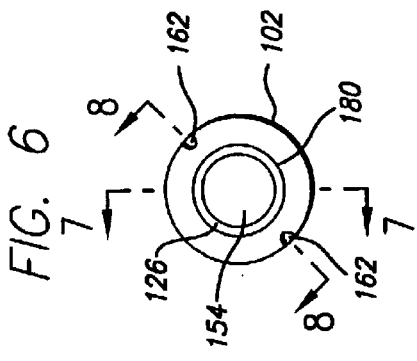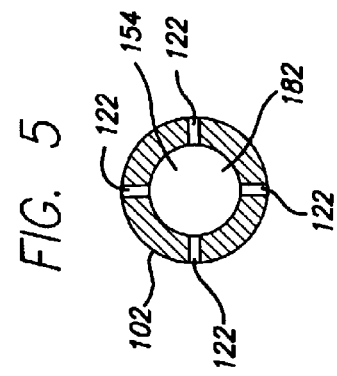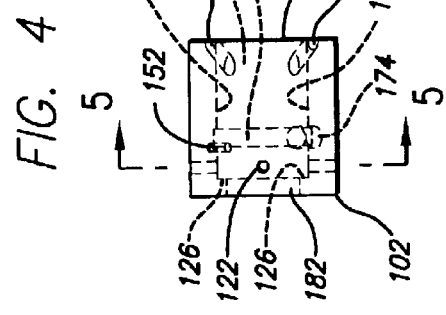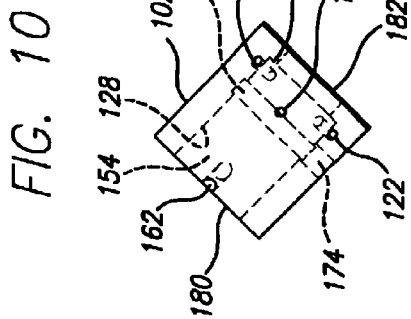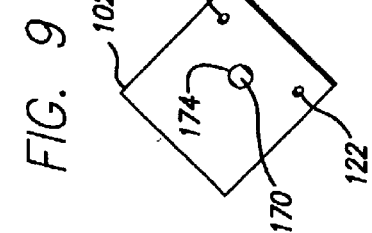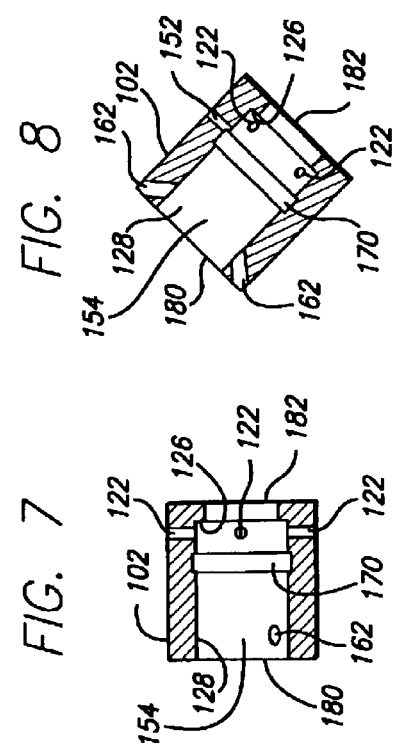

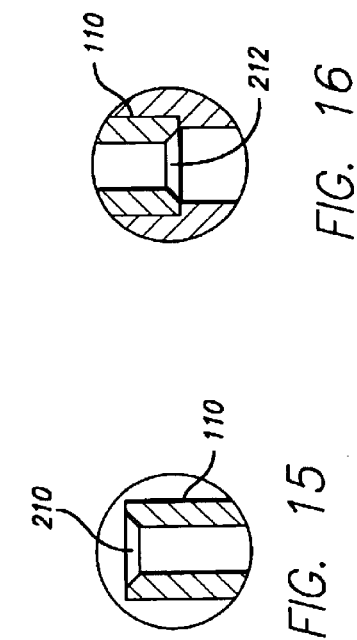
FIG. 12
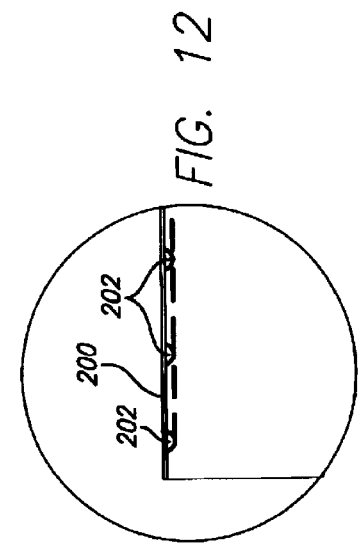
FIG. 16
FIG. 15
FIG. 14
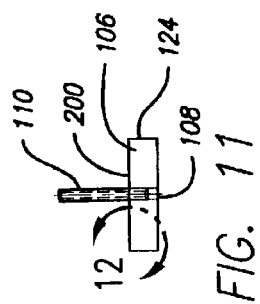
FIG. 11
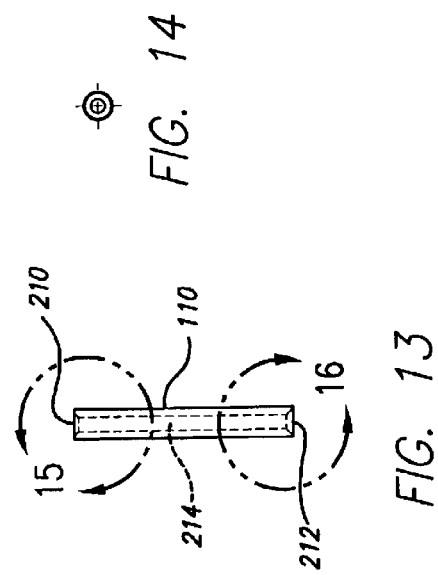
FIG. 13

POWDER FEED SPLITTER FOR HAND-HELD LASER POWDER FUSION WELDING TORCH

CROSS-REFERENCES TO RELATED APPLICATIONS

This application is related to U.S. patent application Ser. No. 10/071,025 filed Feb. 8, 2002 entitled HAND-HELD POWDER-FED LASER FUSION WELDING TORCH, which is incorporated herein by reference.

BACKGROUND OF THE INVENTION

1. Field of the Invention

This invention relates to powder fusion welding and more particularly to a splitter for a fluid and powder flow stream that enables a single stream of such powder flow to become several streams.

2. Description of the Related Art

With the increased use of lasers to provide powder fusion welding, articles can be constructed having net shape or near-net shape. This provides significant advantages as compared to casting or other component-making processes.

In a powder fusion process, fusion material is fed to the active focus point of the welding tool, usually a laser or other energy source. The powder may contain a variety of different substances including particulate metals and plastics. Generally, a reservoir of fusion powder is used to deliver the fusion powder to the welding torch. In some cases, the powder flow stream must be split into several substreams in order to provide better powder flow to the welding torch through several different flow trajectories. Otherwise, separate, independent, and generally-expensive feed powder reservoirs and systems would be used where multiple feed powder lines are needed. The fusion powder is generally delivered to the welding torch by means of pressurized gas, or fluid, such as an inert or non-reactive gas such as helium, argon or nitrogen.

While the art of providing nozzles for laser welding torches is well developed, the art of powder flow splitters is less developed. Some of the problems arising with the splitting of fusion powder flow relate to aberrations or flaws within the flow lines or system design, which can cause the powder to stick and resist the forward travel of the powder. Over time, particles may collect at a certain point and accumulate into a blockage. Additional problems may arise from the generation of static electricity from interparticle friction as well as the loss of downstream pressure during the powder flow splitting process.

Additionally, in one known splitter design, there is no adjustability of the output flow streams to vary powder and fluid flow between the various output flow streams.

The conventional splitter has internal recessed apertures set apart from a main block where the channels then diverge in an outward configuration. The splitter is generally in two parts which are held together by a bolt or screw and there can be some relative movement due to the loose fit between the incoming powder flow cap and the outgoing splitter feed channels.

Under certain circumstances, this powder feed splitter is subject to clogging which dramatically interferes with the operation of any process relying upon the split powder feed. Once the splitter begins to clog, powder flow is reduced and if diminished too much, the entire operation must be stopped and the splitter cleaned and the clog removed. This may involve dismantling the splitter and interrupting the laser fusion process that is dependent upon the split powder flow.

Additionally, no gas pressure is used in the conventional splitter configuration, above, to enhance powder flow. Gravity flow alone serves as the means by which its powder feed is split into separate powder flow lines. Additionally, because the powder feed output lines do not travel outwardly straight from the powder feed splitter, but instead radiate outward at an angle, additional clogging may occur in the powder flow lines. Due to both the loose fit between the powder feed splitter halves and the inability to reliably and selectively control the incoming powder flow within the powder splitting portion, it is difficult to repeatably align and adjust such a previously-known powder feed splitter.

In view of the foregoing disadvantages present in the art, there is a need for an improved powder flow splitter that reduces clogging and/or allows adjustability and/or enhances or overcomes gravity flow with pressurized fluid and powder flow. The present invention solves one or more of these disadvantages.

SUMMARY OF THE INVENTION

The present invention provides a powder flow splitter that is reliable and/or adjustable. In particular, the inventive splitter reduces clogging and/or allows output flow adjustability and/or can provide fluid powder flow despite gravitational forces. In particular, and by way of example only, the splitter may include a distribution assembly with smooth interior surfaces that generally prevent the powder from sticking or clogging. The splitter also may enable adjustable powder flow distribution between the outgoing lines as well as selectably control the pressure downstream from the powder flow splitter.

In one embodiment, which will be described subsequently in greater detail, a fusion powder flow splitter is provided that allows one stream of fusion powder to be selectively split into several streams as needed by an operation. A powder fusion machine is also provided that includes the inventive powder splitter.

In one embodiment, the splitter housing forms part of a housing assembly and includes a central aperture for a powder feed disk that feeds powder flow into an internal splitter area. The splitter housing generally defines a longitudinal axis and accepts an insert that uniquely fits in position inside the main exterior cylinder by means of an aligning dowel pin. The splitter area is coated on the insert and uses funnel-shaped flow paths to channel the powder transmitted from the powder flow disk into the separate output lines exiting from the splitter.

The splitter housing may have a gas inlet that is in communication with holes or apertures in the side of the interior splitter to transmit inert or non-reactive flow gas under pressure to the separating flows of fusion powder.

The powder flow feed regulator may be centrally located between the diverging flow lines of the splitter cylinder. An adjustment mechanism, which may be thumb screws or computer controlled servos allows for radial adjustment of the powder inlet disk (with respect to the longitudinal axis of the housing) so that one or more of the outgoing powder flow channels may receive more or less of the incoming powder flow. This adjustability enables powder flow to be biased according to the welding process or the welder's preferences.

Smooth surfaces inside the powder feed splitter and mediating surfaces between transition surfaces enable the powder to flow smoothly with lower risk of blockages or clogging.

Additionally, material to be treated by powder fed in a split manner may also be achieved by providing a reservoir of powder or other fluid-like material by which the material is to be treated. The powder or fluid reservoir is then transmitted to a powder feed or fluid feed splitter which splits the incoming integrated powder or fluid flow into two or more outgoing feed lines. The material to be treated may then be subject to powder and/or fluid flow via the separate lines emerging from the powder feed splitter. This output powder flow can be adjusted or allocated amongst the output lines emerging from the splitter.

Other features and advantages of the present invention will become apparent from the following description of the preferred embodiment(s), taken in conjunction with the accompanying drawings, which illustrate, by way of example, the principles of the invention.

BRIEF DESCRIPTION OF THE DRAWINGS

FIG. 1 is a front, side, perspective, and exploded view of the powder flow splitter of the present invention.

FIG. 2 is a side elevational view of the assembled powder flow splitter of FIG. 1.

FIG. 3 is a cross sectional view of the assembled powder flow splitter of FIG. 2 taken along line 3—3 of FIG. 2.

FIG. 4 is a side elevational view of the main exterior cylinder of the powder flow splitter shown in FIG. 1 with interior elements and surfaces shown in phantom.

FIG. 5 is a rear cross sectional view of the main exterior cylinder of FIG. 4 taken along line 5—5 of FIG. 4.

FIG. 6 is a front plan view of the main exterior cylinder of the powder flow splitter of FIG. 1.

FIG. 7 is a side cross sectional view of the main exterior cylinder taken along line 7—7 of FIG. 6.

FIG. 8 is a side cross sectional view of the main exterior cylinder taken along line 8—8 of FIG. 6.

FIG. 9 is a side plan view of the main exterior cylinder of the powder flow splitter of FIG. 1 showing the thumb screw holes on opposite sides of the gas inlet hole.

FIG. 10 is a side plan view of the main exterior cylinder similar to that of FIG. 9 showing in phantom elements and surfaces interior to the main exterior cylinder.

FIG. 11 is a side elevational view of the interior surfaces and elements of the powder inlet regulator disk shown in FIG. 1.

FIG. 12 is an enlarged view of the rear surface of the powder inlet disk shown in FIG. 11 taken along circle 12 of FIG. 11.

FIG. 13 is a side plan view of the inlet tube of the powder inlet disk of FIG. 11 with interior surfaces and elements shown in phantom.

FIG. 14 is a top view of the inlet tube shown in FIGS. 13 and 11.

FIGS. 15 and 16 are the top and bottom inlet and outlet ends of the inlet tube shown in FIG. 13 being taken respectively along circles 15 and 16 thereof.

DESCRIPTION OF THE PREFERRED EMBODIMENT(S)

Figure 17:
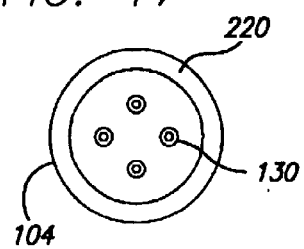
FIG. 17 is a front plan view of the interior splitter cylinder of FIG. 1.
Figure 18:
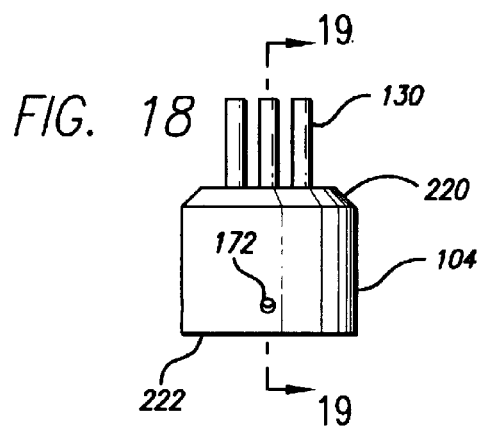
FIG. 18 is a side plan view of the interior splitter cylinder.
Figure 19:
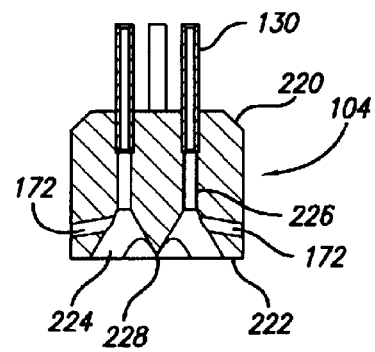
FIG. 19 is a side cross sectional view of the interior splitter cylinder of FIG. 18 taken along line 19—19 thereof.
Figure 20:
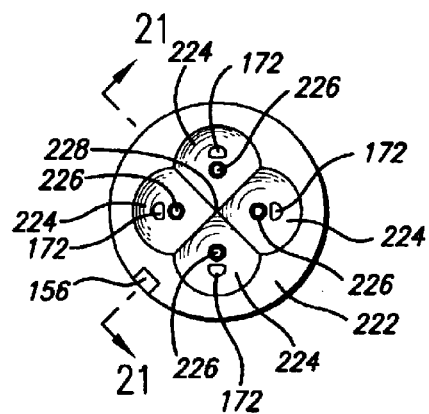
FIG. 20 is a rear plan view of the interior splitter cylinder of FIG. 18.
Figure 21:
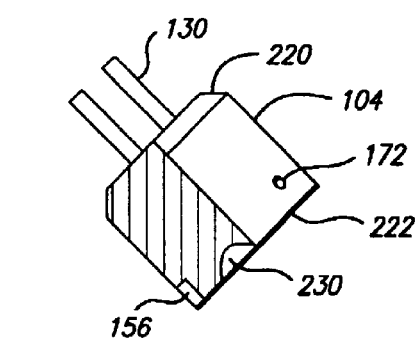
FIG. 21 is a side and partial cross sectional view of the interior splitter cylinder of FIG. 18 taken along cross section line 21—21 in FIG. 20.
Figure 22:
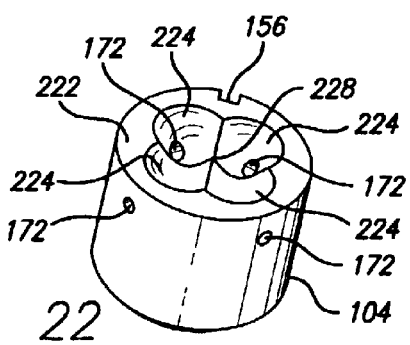
FIG. 22 is a rear perspective view of the interior splitter cylinder of FIG. 18.

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

As shown in FIG. 1, the invention is embodied in a powder feed splitter 100 for hand-held or floor-mounted laser powder fusion welding torch systems or the like. The splitter is used to divide the flow of powder from a single incoming line to two or more, or in this case four, exiting or outflow lines. In doing so, additional gas may be used to pressurize the powder flow as the cross sectional area of the single incoming line may need to be accommodated by the greater cumulative outflow cross section of the outgoing lines. Additionally, the distribution of powder flow among the outgoing lines can be adjusted in a manner to accommodate the device ultimately using the powder flow such as when a hand-held laser torch is tilted at an angle which may cause the powder flow to increase through a lower powder flow line. It should be appreciated that the powder feed splitter 100 can be used in a hand-held laser torch system or a stationary floor-mounted laser powder fusion machine.

As shown in FIG. 1, the powder feed splitter 100 has an exterior encasing cylinder 102 that cylindrically surrounds a removable interior splitter cylinder 104. A sealing powder inlet regulator or plate, in this instance in the shape of a disk 106, has a central powder flow inlet 108 through which powder flows onto the interior splitter cylinder 104. A powder inlet tube 110 allows the injection of powder flow into the central inlet aperture 108 and onto the interior splitter cylinder 104. Depending on the geometry and application for the splitter 100, inlet regulators of various shapes and configurations may be used.

The exterior encasing cylinder 102 provides an exterior case for the interior splitter cylinder 104. The exterior cylinder 104 enables the alignment, adjustment, and the coupling of gas flow to the interior splitter cylinder 104.

As shown in FIG. 1, the splitter has an adjustment mechanism. In particular, two sets of oppositely opposed thumb screws 120 threadably or otherwise are passed through rear thumb screw apertures 122 to engage the flat cylindrical side 124 of the sealing inlet disk 106. Other adjustment mechanisms can be used that use electrical or mechanical engagement to provide movement, including servomotors to control the thumbscrews. As shown in FIG. 3, the exterior cylinder 102 has a rear seat 126 against which the rear side of the inlet disk 106 sits. As described in more detail below, the inlet disk 106 sits against the rear cylinder seat 126 to generally provide a gas-proof seal. However, the outer diameter of the inlet disk 106 is significantly less than that of the interior diameter of the exterior cylinder 102. The flat cylindrical side 124 of inlet disk 106 generally does not sit flush against the interior cylindrical side 128 of exterior cylinder 102. This allows adjustment of the position of the central powder flow inlet aperture 108 so that it can be offset from the center of the interior splitter cylinder 104. This enables selectable biasing of the powder flow amongst the four exit tubes 130 of the interior splitter cylinder 104.

The adjustment of the sealing inlet disk 106 is achieved by use of the thumb screws 120 as their ends 140 proximate the side 124 of the inlet disk 106 engage the disk side 124 in order to adjustably dispose it with respect to the interior splitter cylinder 104. While thumb screws 120 are shown in FIG. 1, the present invention is susceptible to modification in order to provide automatic adjustment and/or electronic adjustment of the inlet disk 106 by computer or other controlled servo motors operating the thumb screws 120 or similar adjusting devices.

The exterior encasing cylinder 102 also has an alignment dowel 150 that fits into an alignment hole 152 that serves to engage the interior splitter cylinder 104 and so consistently and uniquely position the splitter cylinder 104 within the interior 154 of the exterior cylinder 102.

As shown in FIG. 1, the splitter cylinder 104 has an alignment slot 156 at the rear 158 of splitter cylinder 104. As shown in FIG. 3, the alignment dowel 150 travels into the alignment slot 156 in order to position the splitter cylinder 104 in the same position every time with respect to the exterior cylinder 102. Once in place, the splitter cylinder 104 may then be held against the inlet disk 106 by compression pins 160 which may threadably engage the cylinder 102 via threaded or otherwise compression pin apertures 162 and hold the splitter cylinder 104 in place as shown in FIG. 3.

In order to allow the transmission of inert or other gas to the splitter cylinder 104, the exterior cylinder 102 has an interior groove 170 circumscribing the interior 128. This interior groove 170 corresponds with the gas inlet holes 172 of the splitter cylinder 104. The construction and operation of the interior splitter cylinder 104 is set forth in more detail below. However, FIG. 4 shows in phantom the gas flow channel, or gas inlet, 174 in communication with the interior groove 170. When the splitter cylinder 104 is in place within the confines of the exterior cylinder 102, pressurized gas may enter into the interior gas groove 170 and flow into the splitter cylinder 104 via the gas inlet holes 172 thereof. The addition of such gas through the gas flow inlets 172 by necessity dilutes the powder flowing through the splitter cylinder 104.

The exterior cylinder 102 has a front aperture 180 into which the splitter cylinder 104 and the inlet disk 106 fit. The rear aperture 182 is smaller than the front aperture and provides the rear seat 126 onto which the inlet disk 106 rests. The rear seat 126 prevents the further travel of the inlet disk 106 which as described above has a diameter greater than that of the rear aperture 182 but less than that of the interior 154 of the exterior cylinder 102. To prevent the escape of gas from the exterior cylinder 102, the inner splitter cylinder 104 generally has an outer diameter minimally less than the diameter of the exterior cylinder interior 154 such that the splitter cylinder 104 is able to slide into the cylinder 102 but prevents or inhibits the passage of gas between the splitter cylinder 104 and the exterior cylinder 102.

FIGS. 4–10 show alternative and visually-descriptive views of the exterior cylinder 102.

In FIG. 11, the sealing inlet disk 106 is shown in side and partial cross sectional view. As with the other components of the present invention, the inlet disk may be made of suitable material, such as resilient and machinable metal. As the flowing powder may have abrasive qualities, the materials used in the present invention may include those that can withstand such abrasion or that are easily replaced once abrasion has significant deleterious effects on the powder feed splitter set forth herein. The inlet disk 106 has a central aperture 108 into which the outer inlet tube 110 may fit or be attached.

As indicated in FIG. 12, the rear surface 200 of the inlet disk 106 may be scored with a series of concentric circles 202 centered upon the central aperture 108. These concentric circles are visible from the rear of the powder feed splitter 100 via the rear aperture 182 of the exterior cylinder 102. The concentric engraved circles 202 may be approximately one ten-thousandth of an inch deep and separated by a distance of approximately one one-thousandth of an inch. The concentric circles 202 indicate the alignment of the inlet disk 106 with respect to the splitter cylinder 104. The degree to which the inlet disk is off center is indicated by the number of circles occluded by the rear seat 126 that would otherwise be visible but for the inlet disk 106 being off center. The depth of the grooves 202 is sufficient for visual inspection and the distance between the engraved circles 202 is one of choice and general utility with respect to the powder feed splitter 100.

Generally, when the inlet disk 106 is centered over the splitter cylinder 104, the powder flow is distributed equally amongst the outlet tubes 130. When the inlet disk is off center, the powder flow distribution amongst the several tubes 130 is generally biased according to those tubes receiving the biased amount of incoming powder flow. More detail is given below with respect to the splitter cylinder 104 with respect to FIGS. 17–21.

FIGS. 13–16 show pertinent views of the inlet tube 110 to which a powder flow line is attached for the introduction of flowing powder into the powder feed splitter 100. The inlet tube 110 may be copper tubing with a chamfered inlet 210 and exit 212. The tube 110 is constructed to prevent caking, clogging, or obstruction of flowing powder in order to ensure that the maximum cross section is available for the flow of powder. The chamfered inlet 210 and exit 212 generally contribute to such anti-caking, anti-clogging, and/or anti-obstruction properties. FIG. 14 shows an aspect of the inlet tube 110 a view taken down the center while FIGS. 15 and 16 show the inlet 210 and exit 212 respectively. The chamfering of the tube 110 enables incoming powder to be channeled towards the interior passage 214 while the chamfering of the exit tube 212 allows the powder to disperse better and more smoothly before engaging the splitter cylinder 104.

As shown in FIG. 17, splitter cylinder 104 is preferably generally cylindrical in nature and may have a beveled shoulder 220 that mediates the wider diameter of the main body portion with respect to the narrower front face of the splitter cylinder 104 from which the outlet tubes 130 emerge. The outlet tubes 130 may be similar in construction to the inlet tube 110. The interior confines of the splitter cylinder 104 are shown in the cross sectional view of FIG. 19. At the rear end 222 of the splitter cylinder 104, a series of four funnel-like, or conical, cavities, or hoppers, 224 are present that guide the powder from the inlet disk aperture 108 to the outlet tubes 130 via intermediating internal channels 226 inside the splitter cylinder 104. Each of the funneling cavities 224 is coupled to a gas inlet 172. Each of the gas inlet tubes 172 may incline towards the outlet tubes 130 so as to provide directionality for gas flow and to inhibit powder flow back into the gas inlet 172. The conical cavities 224 intersect at a central point 228 which serves to provide a minimal flat surface on which powder may collect. It also serves to better split the incoming single powder flow stream into one of the intermediating internal channels 226. When the inlet disk 106 is centered with respect to the exterior cylinder 102, the central aperture 180 is preferably aligned with the central point. The conical shape of the cavities 224 provides a guide for the powder as the powder travels through the cavity. The conical nature of the cavity 224 is generally that of a right circular cone to provide better funneling, or channeling of the flowing powder. The right circular nature of the cavities 224 may be altered at the intersection of the cones to generally provide for equal cross sectional areas between cavities 224.

Although there may be a strict separation between any two cavities, or hoppers, 224, an intercavity valley 230 (FIG. 21) may be present between cavities 224 to allow better dispersion of powder between two adjacent cavities 224.

As indicated above, a variety of materials may be used to construct the powder flow splitter 100 of the present invention. However, stainless steel is seen as being amenable to the present embodiment for the interior splitter cylinder 104 and the exterior encasing cylinder 102. Steel or other materials may be used for the thumb screws 120 or compression pins 160 with copper being seen as adapted for use for the inlet 110 and outlet 130 tubes. However, just as other shapes than cylinders may be used for the exterior 102 and interior 104 portions of the present invention (including squares, triangles, and the like), different materials may also be used so long as they are adaptable and useful in providing the structures and geometries necessary for the present invention.

Additionally, the interior splitter cylinder 104 may take a variety of configurations and/or geometries as an interior insert for an exterior casing having the qualities, characteristics, and aspects of the exterior encasing cylinder 102. The sealing inlet disk 108 may also take the form of a plate, other flat structure, or otherwise so long as it performs as indicated herein. Also, while in one embodiment the gas flow inlets 107 are shown in a co-planar configuration, other configurations may also be achieved.

When assembled, the inlet disk 106 sits flush against the rear seat 126 of the exterior cylinder 102. The inlet tube 110 projects rearwardly from the exterior cylinder 102 and away from the rear aperture 182. The inlet disk 106 may be centrally disposed between the thumb screws 120 and their proximate ends 140 that engage the flat cylindrical side 124 of the inlet disk 106. The interior splitter cylinder 104 sits flush against both the inlet disk 106 and the interior side 128 of the exterior cylinder 102. In this way, the interior splitter cylinder 104 seals off the conical cavities 224 and prevents the transmission of powder save by travel through the intermediating internal channels 226 and the exit tubes 130.

The splitter cylinder 104 engages the dowel pin 150 with its alignment slot 156 such that the splitter cylinder 104 generally has one unique operating engagement configuration with respect to the exterior cylinder 102. When the splitter cylinder 104 has been properly situation with respect to the exterior cylinder 102 and the dowel 150 is seated in the alignment slot 156, the gas inlet apertures 172 of the splitter cylinder 104 are aligned and surrounded by the interior gas groove 170 of the exterior cylinder 102. The flush seating between the interior splitter cylinder 104 and the interior 128 of the exterior cylinder 102 generally serves to seal the interior gas groove 170 and to prevent the flow of gas beyond the gas groove 170. The compression pins 160 then engage the splitter cylinder 104 at or about the beveled shoulder 220 and serve to compress the splitter cylinder 104 against the inlet disk 106. The outlet tubes 130 then project past the compression pins 160 and are available for engagement by additional powder flow lines. Such powder flow lines may be flexible in nature and similar to that which engages the inlet tube 110 in order to provide the initial powder flow stream to the powder flow splitter 100.

Having assembled the powder flow splitter 100, inert, noble, and/or appropriate gas flow may be introduced into the apparatus via the gas inlet 174 of the exterior cylinder 102 (FIGS. 4 and 9). Such gases are generally chosen to prevent oxidation of hot and/or melted powder. Gas then flows into the gas groove 170 and is transmitted to the outlet tubes 130 via the splitter cylinder gas inlets 172. The gas then travels through the conical-shaped funneling cavities 224 and through the intermediating internal channels 226 before exiting via the outlet tubes 130. In one embodiment, the splitter cylinder gas inlets 172 may be tapered in nature to provide some back pressure on the gas flow. The gas flow used and introduced via the exterior cylinder gas inlet 174 may be the same as that used to transport the powder from the main powder reservoir (not shown). The additional gas is used to propel the powder through the feed splitter and onto the main tool requiring powder feed such as a laser welding torch or other laser fusion device. The introduction of additional gas enables the better control of the powder flow and ensures that there is no loss of pressure despite the possible greater cumulative cross section available amongst the several outlet tubes 130 as compared to the single inlet tube 110.

Gas-driven powder is then fed into the inlet 110 and flows onto the splitter cylinder 104. If the inlet disk 106 is centrally disposed over the central point 228 of the splitter cylinder 104, the powder is generally evenly distributed amongst the several conical-shaped funneling cavities 224. If the flow inlet aperture 108 is offset from the central point 228, the powder flow will generally be biased so that greater powder flow is transmitted to the exit tube 130 associated with the conical-shaped funneling cavity 224 more disposed under the inlet aperture 108 as that conical-shaped funneling cavity 224 will receive more of the incoming powder flow. The intercavity valley 230 may allow some migration of powder to and from the cavity 224 experiencing predominant powder flow. Such migration may occur for all cavities 224.

The gas-driven powder is then transmitted to the intermediating channels 226 where it is further pressurized by the incoming gas from the splitter cylinder gas inlets 172. The powder flow is then transmitted onto the exit tubes 130 and out the powder feed splitter 100 of the present invention.

Certain accommodations may be made to enhance powder flow and the present invention generally incorporates smooth surfaces to reduce turbulence and to reduce the caking, clogging, or obstruction of powder flow so that maintenance is reduced and performance enhanced. The powder flow splitter 100 may be grounded to alleviate static electricity arising from the self-abrasion of the powder or otherwise. Many different types of powders may be used with the splitter 100 not the least of which are finely dispersed refractory metals, ground steel or steel dust, plastic granules and fine particles, and the like.

The present splitter can provide independent advantages over prior powder feed splitters due to its adjustable nature, and the ability to dismantle and reassemble the component parts in a predictable and reliable manner. The use of smooth surfaces and smooth surface transitions of the present invention reduces turbulence and prevents caking, clogging, or buildup of flowing powder. Powder density can be adjusted both at the initial powder flow reservoir stage or with the introduction of more gas at the gas inlets 172 and 174.

While the present invention has been described with reference to a preferred embodiment or to particular embodiments, it will be understood that various changes and additional variations may be made and equivalents may be substituted for elements thereof without departing from the scope of the invention or the inventive concept thereof. In addition, many modifications may be made to adapt a particular situation or material to the teachings of the invention without departing from the essential scope thereof. Therefore, it is intended that the invention not be limited to particular embodiments disclosed herein for carrying it out, but that the invention includes all embodiments falling within the scope of the appended claims.

What is claimed is:

1. A powder feed splitter, comprising:
   a housing with two openings and an interior surface therebetween;
   an interior insert defining a plurality of funnel cavities, each funnel cavity generally having a shape that narrows from one end of funnel cavity to the other, the insert sized to fit into the housing; and
   a plurality of outlet tubes, each outlet tube in communication with one of the funnel cavities and located adjacent to the narrow end of the funnel cavity; whereby
   powder may flow from each funnel cavity through each outlet tube.

2. A powder feed splitter as set forth in claim 1, wherein the each cavity is conically-shaped.

3. A powder feed splitter as set forth in claim 1, wherein:
   the interior insert defines a first gas flow inlet enabling gas flow from exterior of the interior insert to each funnel cavity; whereby
   gas may be added to powder flowing from each funnel cavity to each outlet tube.

4. A powder feed splitter, comprising:
   a housing with two openings and an interior surface therebetween;
   an interior insert having a plurality of funnel cavities for receiving flowing powder, each of the plurality of cavities generally having a shape that narrows from one end of the cavity to the other, the insert sized to fit into the housing; and
   a plurality of outlet tubes, each of the plurality of outlet tubes in communication with a single associated respective one of the plurality of funnel cavities such that powder flowing into a single one of the plurality of funnel cavities exits from a single one of the plurality of outlet tubes; whereby
   a single stream of flowing powder is split amongst the plurality of outlet tubes by the plurality of funnel cavities.

5. A powder feed splitter as set forth in claim 4, wherein the plurality of funnel cavities further comprise:
   a plurality of conical shaped funnel cavities.

6. A powder feed splitter as set forth in claim 4, further comprising:
   the interior insert defining a plurality of gas flow inlets, each of the gas flow inlets in communication with a single associated respective one of the plurality of funnel cavities such that gas flowing into a single one of the plurality of gas flow inlets flows into a single one of the plurality of funnel cavities; whereby
   gas may be added to each of the plurality of funnel cavities by the plurality of gas flow inlets.

7. A powder feed splitter as set forth in claim 6, further comprising:
   the plurality of gas flow inlets being generally co-planar in a plane generally perpendicular to a main axis of the interior insert.

8. A powder feed splitter as set forth in claim 6, further comprising:
   an inlet plate defining a central inlet aperture through which powder flows into the plurality of funnel cavities;
   an inlet tube coupled to the central inlet aperture on a side of the inlet opposite that of the plurality of funnel cavities; and
   the inlet plate sealing the funnel cavities to prevent powder flow past the inlet plate; whereby
   a powder stream may be transmitted from the inlet plate to the interior insert and split into separate powder substreams by the plurality of funnel cavities.

9. A powder feed splitter as set forth in claim 8, further comprising:
   an exterior casing into which the inlet plate and the interior insert fit;
   the exterior casing having a seat against which the inlet plate sits to sealingly engage the exterior casing;
   the exterior casing defining an interior gas flow groove and a gas flow channel in communication with the gas flow groove to enable gas flow from outside the exterior casing to the interior gas flow groove;
   the plurality of gas flow inlets of the interior insert communicating with the interior gas flow groove; and
   an exterior surface of the interior insert generally adjacent an interior surface of the exterior casing to prevent powder flow past the interior insert; whereby
   powder flowing through the inlet plate and into the interior insert and the plurality of funnel cavities may be pressurized and diluted by gas flowing into the interior insert and the plurality of funneling channels via the gas flow channel of the exterior casing.

10. A powder feed splitter as set forth in claim 9, further comprising:
    the interior insert defining an alignment slot; and
    a dowel, the dowel passing through the exterior casing for engaging the alignment slot; whereby
    the interior insert properly fits into the exterior casing in a unique configuration when the interior insert engages the dowel via the alignment slot.

11. A powder feed splitter as set forth in claim 9, further comprising:
    at least one adjustment mechanism operatively engaging the inlet plate for movement thereof.

12. A powder feed splitter as set forth in claim 11, wherein:
    four adjustment rods threadably engage the exterior casing.

13. A powder feed splitter as set forth in claim 11, wherein:
    the adjustment rods being selectably driven by computer-controlled servos.

14. A powder feed splitter as set forth in claim 12, further comprising:
    compression pins threadably engaging the exterior casing and compressing the interior insert against the inlet plate.

15. A powder feed splitter as set forth in claim 9, further comprising:

the inlet plate being scored with concentric engravings centered on the central aperture, the concentric engravings indicating disposition of the inlet plate relative the interior insert.

16. A powder feed splitter as set forth in claim 15, further comprising:

the inlet plate being circular.

17. A powder feed splitter as set forth in claim 9, further comprising:

the inlet tube and plurality of outlet tubes being chamfered at inlets and exits thereof.

18. A method of providing powder and fluid flow to material to be treated by a multichannel welding nozzle using an adjustable powder flow splitter, the steps comprising:

providing a source of pressurized powder, the powder for melting to treat the material;

transmitting a pressurized powder flow stream to the powder feed splitter, wherein the powder feed splitter divides the powder stream into a plurality of output powder flow streams;

transmitting the powder flow output streams to the material to be treated; and adjusting the powder flow splitter to selectively change the powder flow amongst the output powder flow streams.

19. A powder feed splitter for use with a powder fusion welding machine, the powder feed splitter comprising:

a housing assembly with at least one input opening, at least two output openings and an interior surface therebetween defining a longitudinal axis, the interior surface also defining at least two adjacent funnel cavities located between the input and output openings;

an inlet regulator with an opening therein, the regulator located between the funnel cavities and the input opening of the housing assembly, the opening in the inlet regulator movable relative to the funnel cavities in a direction radially away from the longitudinal axis of the housing assembly; and an adjustment mechanism in operative engagement with the inlet regulator for selective movement of the inlet regulator opening.

20. The powder feed splitter of claim 19, wherein the adjustment mechanism comprises four screws engaged with the housing to move the inlet regulator.

21. A powder fusion machine for treating of material, the machine comprising:

an energy source directed at the material;

a powder feed system having a powder source;

a source of pressurized fluid, the fluid directed to the powder to move it through the system;

at least two output openings positioned to direct power flow into the area of the material receiving the energy from the energy source;

a powder feed splitter in fluid communication with the output openings of the powder feed system, the splitter having a housing assembly with at least one input opening, at least two output openings and an interior surface therebetween defining a longitudinal axis, the interior surface also defining at least two adjacent funnel cavities located between the input and output openings;

an inlet regulator with an opening therein, the regulator located between the funnel cavities and the input opening of the housing assembly, the opening in the inlet regulator movable relative to the funnel cavities in a direction radially away from the longitudinal axis of the housing assembly; and an adjustment mechanism in operative engagement with the inlet plate for selective movement of the inlet regulator opening.

22. The powder fusion machine of claim 21, wherein the adjustment mechanism comprises four screws engaged with the housing to move the inlet regulator.

* * * * *

UNITED STATES PATENT AND TRADEMARK OFFICE
CERTIFICATE OF CORRECTION

PATENT NO. : 6,894,247 B2
DATED : May 17, 2005
INVENTOR(S) : Federico Renteria et al.

It is certified that error appears in the above-identified patent and that said Letters Patent is hereby corrected as shown below:

Column 9,
Line 21, add -- and configured to be removable from the housing;
    an inlet regulator disposed within the housing and configured to move therethrough to selectively seat and unseat against the interior insert -- after the word "housing".
Line 27, add -- with each funnel cavity collecting powder from a broader area for transmission to each narrower outlet tube -- after the word "tube".
Line 44, add -- and configured to be removable from the housing;
    an inlet regulator disposed within the housing and configured to move therethrough to selectively seat and unseat against the interior insert -- after the word "housing".

Column 10,
Line 1, add -- wherein the inlet regulator -- after ",".
Line 2, delete "comprising" and add -- comprises --.

Signed and Sealed this

Twenty-fifth Day of October, 2005

JON W. DUDAS
*Director of the United States Patent and Trademark Office*